United States Patent [19]

Arnout et al.

[11] Patent Number: 5,114,121
[45] Date of Patent: May 19, 1992

[54] CUTTING HEAD WITH OXYGEN JET

[75] Inventors: Michel Arnout, Franconville; Didier Lasnier, Cergy; Richard Soula, Jouy-Le-Moutier, all of France

[73] Assignee: L'Air Liquide, Societe Anonyme Pour L'Etude et L'Exploitation Des Procedes Georges Claude, Paris, France

[21] Appl. No.: 521,334

[22] Filed: May 9, 1990

[30] Foreign Application Priority Data

May 12, 1989 [FR] France ................. 89 06247

[51] Int. Cl.⁵ ............................................... B23K 7/00
[52] U.S. Cl. ................................................ 266/48
[58] Field of Search ................. 266/48, 76; 239/424.5

[56] References Cited

U.S. PATENT DOCUMENTS

| 1,733,698 | 10/1929 | Rose | 266/48 |
| 2,033,568 | 3/1936 | Coberly | 266/48 |
| 2,491,440 | 12/1949 | Boedecker et al. | 266/48 |
| 3,575,354 | 4/1971 | Hach | 239/424.5 |

FOREIGN PATENT DOCUMENTS 493088 10/1938 United Kingdom .
494218 10/1938 United Kingdom .

Primary Examiner—S. Kastler
Attorney, Agent, or Firm—Curtis, Morris & Safford

[57] ABSTRACT

The present invention concerns a cutting head made of a cutting nozzle (2) with cutting oxygen duct (6) having radial ribs (11), the assembly being force fitted in a sheath (3) thus forming ducts of oxycombustible mixture (32). This nozzle which produces an improved heat dissipation can be made of reduced dimensions.

6 Claims, 1 Drawing Sheet

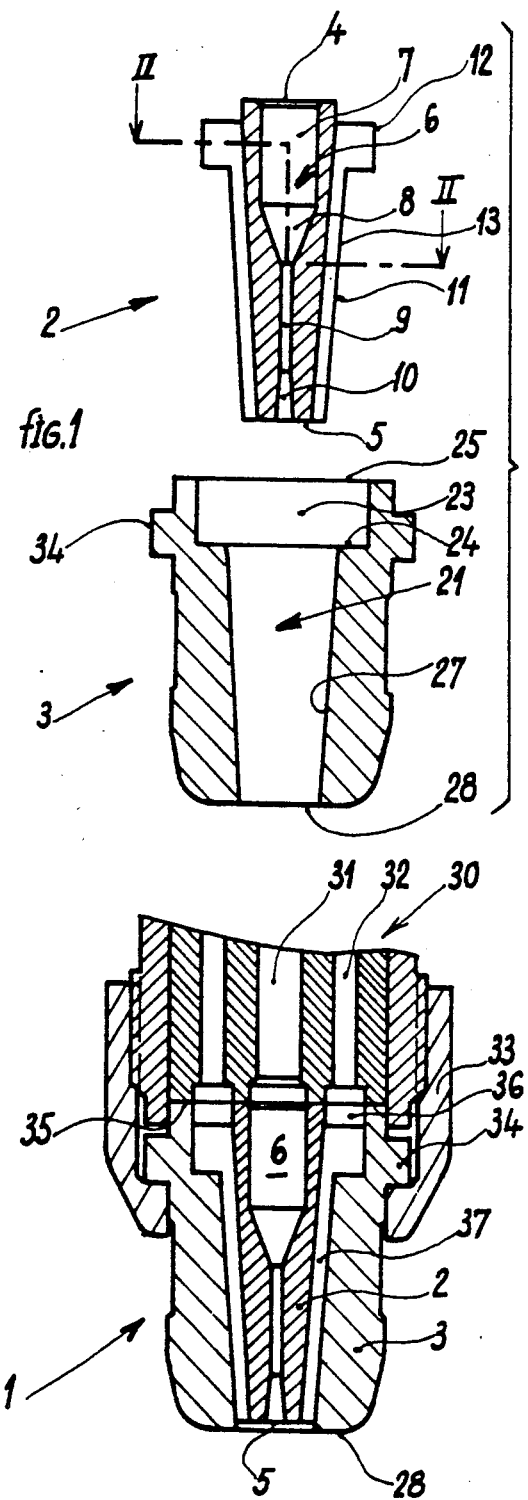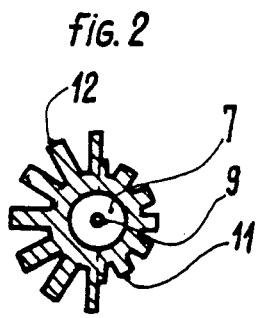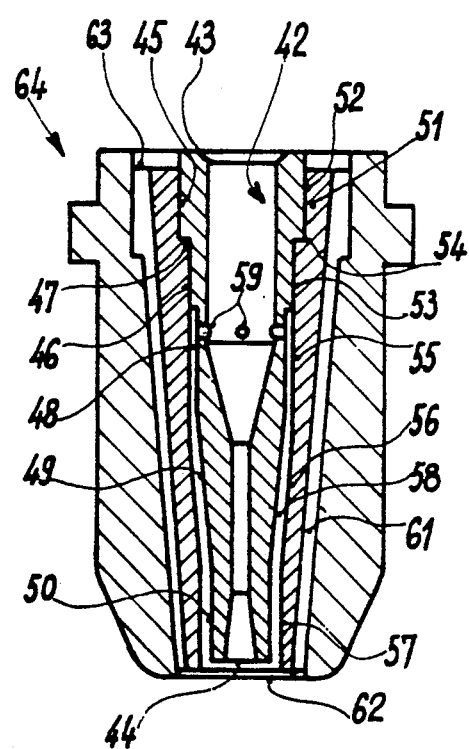
Fig. 1  Fig. 2  Fig. 3  Fig. 4

CUTTING HEAD WITH OXYGEN JET

BACKGROUND OF INVENTION (1) Field of the Invention

The present invention concerns a cutting head having a cutting oxygen axial duct and a plurality of coaxial ducts of oxycombustible mixture connected upstream to an annular distribution chamber of combustible mixture.

(2) Description of Prior Art

Generally, a cutting head of this type is produced by means of a central cutting member or nozzle having a cutting oxygen axial duct, a plurality of longitudinal ribs on at least a portion of its longitudinal portion, this member being mounted, typically by means of a screw, in an external sheath defining with said ribs said plurality of ducts of oxycombustible mixture.

These known cutting heads have a certain number of disadvantages, for example:

Taking into account the size of the cutting heads (about 50 to 60 mm of axial length), the production of a cutting duct is delicate in as much as this cutting duct has a converging section followed by a collar and a diverging section and that the machining of a converging section, a sonic collar and a diverging section constitute a determining element to give good performances.

The known devices are such that the upstream end of the member incorporating the cutting head covers the sheath end, so that to allow the oxycombustible mixture to pass into the intermediate distribution chamber, it is necessary to provide connecting perforations through this cover.

Sealing of the parts constituting the torch head on the one hand and between head and torch body on the other hand, is difficult to maintain since the degrees of sealing are reduced because of the existence of an annular distribution channel in the upstream end face of the internal member.

Because of the presence of an annular distribution chamber of oxycombustible mixture between the cutting nozzle and the sheath, it is essential that these heads be dismantlable, since when cleaning them after use, small particles of oxides can be introduced inside them and disturb the gaseous flow. On the other hand, this design does not promote the removal of the calories which have been absorbed by the head during a cutting operation.

The cost of these cutting heads is relatively high in starting material and machining in view of their large dimension and the perforations required for feeding an oxycombustible mixture.

The present invention aims at a new head design enabling to solve the problems exposed above, while preserving and even improving operational performances and ensuring to the material an excellent industrial reliability.

SUMMARY OF INVENTION

According to the invention, the ribs of the cutting nozzle extend upstream to a longitudinal position close to the upstream end of the cutting nozzle, the sheath comprises an internal cavity very slightly smaller than an external sheath for ribs, and the cutting nozzle is interlocked with the sheath by force fitting until the upstream end faces of the cutting nozzle and of the sheath are in the same transverse plane constituting a sealing transverse face for the end of a cutting torch body, the ribs thereby defining between them an annular transverse distribution chamber of oxycombustible mixture feeding a plurality of longitudinal ducts of combustible mixture bounded by the ribs between the cutting nozzle and the sheath.

Because of this arrangement resulting from force fitting with abutment positioning, the result is a better mechanical behavior of the assembly, which enables to reduce the dimension, for example in the axial direction, of the cutting head and ensures notably increased heat removal properties, because of the continuous contact of the ribs with the sheath along nearly the entire length thereof.

As a matter of fact:

The manufacture of the cutting duct is easier in view of the decrease of the axial dimension of the head (between 20 and 30 mm, typically of the order of 25 mm, instead, normally, of 50 to 60 mm); this results in a machining of the duct under ideal conditions which guarantees good performances.

A better resistance to heating is obtained because of its "monobloc" design resulting from force fitting.

The costs are lower in materials and machining.

According to a preferred embodiment, the ribs have, on a restricted portion of their upstream section, a radial dimension which is greater than on a main portion of their downstream section, such as to abut against a corresponding shoulder of the sheath.

The invention is also applicable to so-called curtain cutting heads, which are characterized in that the cutting nozzle itself is formed of two members which are connected together by force fitting, namely an internal member with a cutting oxygen duct having an upstream part with external abutment for a second part called curtain nozzle, provided in a downstream part with small widening with respect to the external wall of the cutting nozzle to form annular curtain duct communicating with the cutting oxygen duct by means of perforations, said curtain nozzle having said ribs outwardly thereof and being force fitted in the nozzle sheath.

BRIEF DESCRIPTION OF DRAWINGS

The characteristics and advantages of the invention will appear on the other hand from the description which follows, given by way of example, with reference to the annexed drawings in which:

FIG. 1 is a view in elevation, before mounting, of the two components of a cutting head according to the invention;

FIG. 2 is a sectional view according to arrows II—II of the member defining the cutting nozzle per se.

FIG. 3 is an axial cross-section view of the cutting nozzle in mounted position.

FIG. 4 is an axial cross-section view of an oxygen curtain cutting head consisting of three parts.

With reference to FIGS. 1 to 3, a cutting head 1 consists here of two parts, namely an internal part defining a cutting nozzle 2 or core, and a sheath forming a heating nozzle 3.

The cutting nozzle 2 comprises a machined metallic member of generally slightly truncated shape with a wider upstream end 4 and a narrower downstream end 5, and has an axial duct 6 which extends right through from the upstream end 4 to the downstream end 5. From the upstream end 4 toward the downstream end 5, this duct 6 is made of a cylindrical section 7 of large flushing diameter, followed by a substantially converging section 8, an elongated sonic collar of substantial length 9 and a slight diverging section 10 opening at the downstream end 5. On the outer periphery, the cutting nozzle 2 has a plurality of radial ribs 11 formed by longitudinal milling of the metallic mass and which extend to a position slightly below the end 4 of the cutting nozzle 2 into an axially restricted and radially cylindrical portion of substantial size 12 followed by a main truncated portion 13 whose radial extension is clearly smaller.

The sheath 3 is formed of a relatively large member including an internal cavity 21, at the upstream end, which must conform with very small play to the external cylindrical sheath of the edges of the ribs 11, namely a cylindrical cavity of large diameter at 23 and a truncated cavity 27 extending from a shoulder 24 to the downstream end 28, the sheath 3 being slightly longer in the axial direction than the axial length of the cutting nozzle 2. As indicated, the internal cavity 21 of the heating nozzle 3 is very slightly smaller than the external cylindrical surface of the ribs of the cutting nozzle 2 so that the cutting nozzle 2 can be interlocked in the sheath 3 by forced engagement. This forced engagement is executed until the portion 12 of the ribs 11 is in axial position, wherein the end face 4 of the cutting nozzle 2 and the end face 25 of the heating nozzle 3 are strictly in the same transverse plane, which corresponds to an abutment position of the ribs 12 against shoulder 24. To obtain a strict inherent flatness which is necessary to seal faces 4 and 25 of the cutting and heating nozzles, additional machining is carried out.

When mounted on the body of the torch 30, which has a cutting oxygen axial duct 31 and ducts of oxycombustible mixture 32, by means of a screw 33 resting on outer flange 34 of the heating nozzle 3, the transverse end face 35 of the body of the torch 30 sealingly engages against the end faces 4 and 25 of the nozzle 1, to provide communication between the cutting oxygen axial duct 31 of the body of the torch 30 with the cutting oxygen duct 6 of the cutting nozzle 2, while the various ducts of mixture 32 open in an annular distribution chamber 36, formed between the nozzle 2, sheath 3 and the upstream end of the ribs 12, which chamber feeds an annular plurality of ducts 37 formed between two consecutive ribs 11, which open in the downstream end 5 of the cutting nozzle 2 located in slightly retracted position with respect to the downstream end 28 of the heating nozzle 3 in order to ensure a suitable coupling of the flame for certain gases, such as GPL gases.

With reference to FIG. 4, the cutting head illustrated is made of a composite cutting nozzle formed of two members: one is a central axial member 42 whose outer shape has decreasing cross-section from the upstream end 43 to the downstream end 44, namely to begin with two cylindrical bearings 45 and 46 separated by a shoulder 47, a third cylindrical bearing 48, of slightly smaller diameter than the cylindrical bearing 46, followed by a truncated portion 49 and finally a cylindrical portion 50.

The other member is a sheath referred to as a curtain nozzle 51 which has an internal cavity with walls 52 and 53, separated by a shoulder 54, engaged by force fitting with the cylindrical bearings 45 and 46 and shoulder 47, and a hollowed portion consisting of three axially stepped zones, namely a cylindrical zone 55, a truncated zone 56 and a cylindrical terminal zone 57, whose cross-sections are such that when the members 51 and 42 are mounted together, a free annular space 58 is formed which communicates with the interior of the cutting nozzle through perforations 59, the annular zone between (48-49-50), on the one hand and (55-56-57), on the other hand defining the annular duct for the curtain gas.

As previously described, the external face of the sheath 51 is provided with ribs 61 which longitudinally extend from the downstream end 62 of the sheath to a short distance at 63, of the upstream end of the sheath, the assembly thus produced being force fitted in a sheath 64 of a type previously described.

We claim:

1. A nozzle for mounting on a cutting torch body having an inner end face into which opens a central oxygen feeding duct and at least one laterally spaced combustible gas feeding duct, the nozzle comprising an inner part, an outer part having an annular rear face and formed centrally with a transverse bore for receiving the inner part, the inner part having an annular central rear face and being formed centrally with a transverse passage and having longitudinally extending ribs on an external surface thereof, the inner part being force fitted within the bore of the outer part in relative position such that the annular central rear face of the inner part and the annular rear face of the outer part are coplanar for tight contact with the inner end face of the torch body, the ribs of the inner part extending over substantially all of the length of the inner part and each rib having a rear end terminating at a relatively small distance from the annular central rear face, whereby an annular chamber is defined within the outer part at its rear end, adjacent the inner end face of the torch body.

2. The nozzle of claim 1, wherein the transverse bore of the outer part is formed with a shoulder and the ribs of the inner part are formed with shoulders to be received by the outer part shoulder.

3. The nozzle of claim 1, wherein both the transverse bore and the inner part each includes a tapered longitudinal portion.

4. The nozzle of claim 3, wherein the transverse bore comprises a cylindrical rear potion joining the tapered front portion via a shoulder.

5. The nozzle of claim 1, having an overall length between 20 and 30 mm.

6. The nozzle of claim 1, wherein the inner part is formed of two coaxial members, an outer member formed having the ribs on said external surface thereof and having an internal transverse cavity, and an inner member formed with the transverse passage and having a longitudinal front end portion received within the cavity, the longitudinal front end portion defining within the cavity an annular duct between the outer and inner members communicating with the transverse passage through angularly spaced holes.

* * * * *

UNITED STATES PATENT AND TRADEMARK OFFICE
CERTIFICATE OF CORRECTION

PATENT NO. : 5,114,121

DATED : May 19, 1992

INVENTOR(S) : Michel Arnout et al.

It is certified that error appears in the above-identified patent and that said Letters Patent is hereby corrected as shown below:

Claim 4, line 2 (column 4, line 46), delete "potion" and insert --portion--.

Signed and Sealed this

Sixth Day of July, 1993

Attest:

MICHAEL K. KIRK

Attesting Officer

Acting Commissioner of Patents and Trademarks